E. F. ALTMAN.
FEEDER FOR THRESHING MACHINES.
APPLICATION FILED MAY 1, 1916.
1,261,338.
Patented Apr. 2, 1918.
2 SHEETS—SHEET 2.
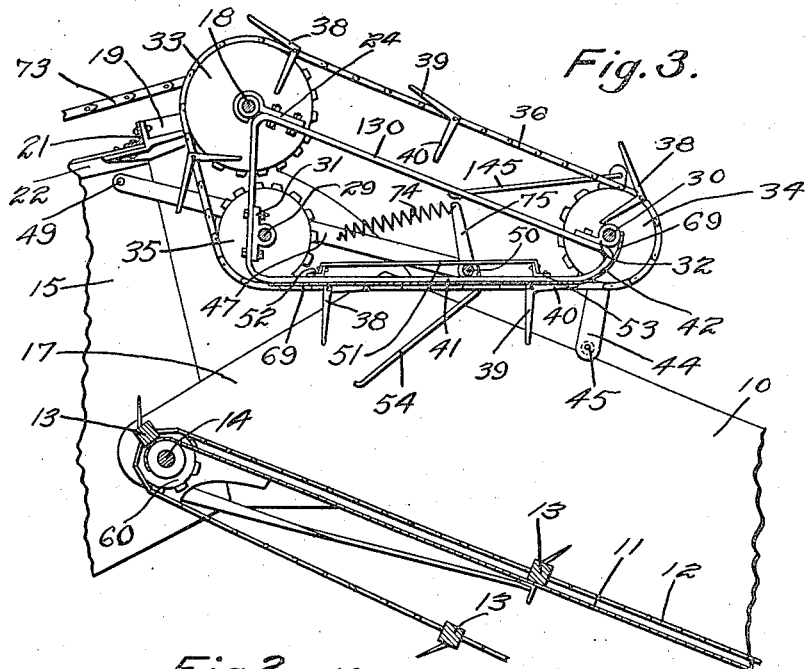
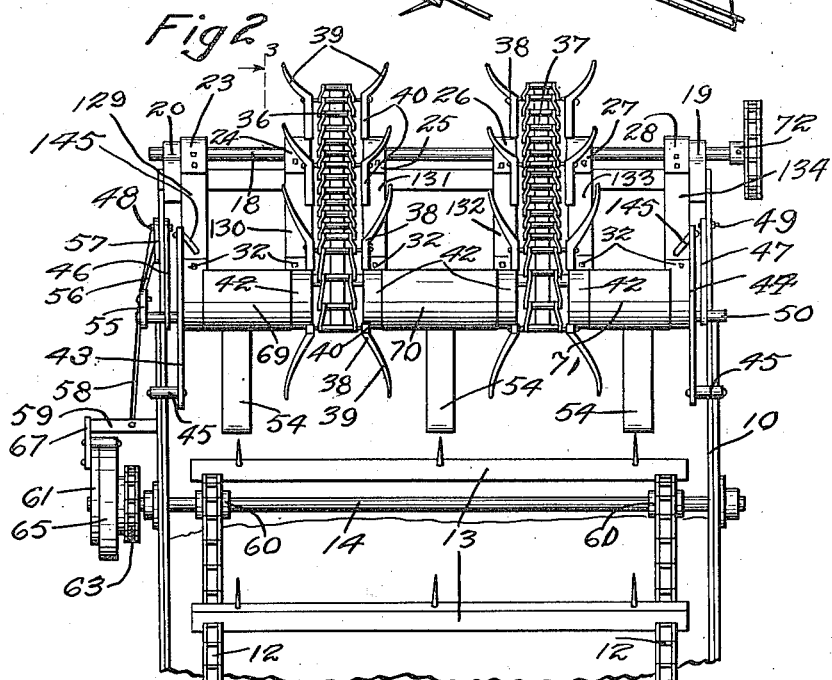
Witnesses:
Inventor:
Elmer F. Altman.
By his Attorney.

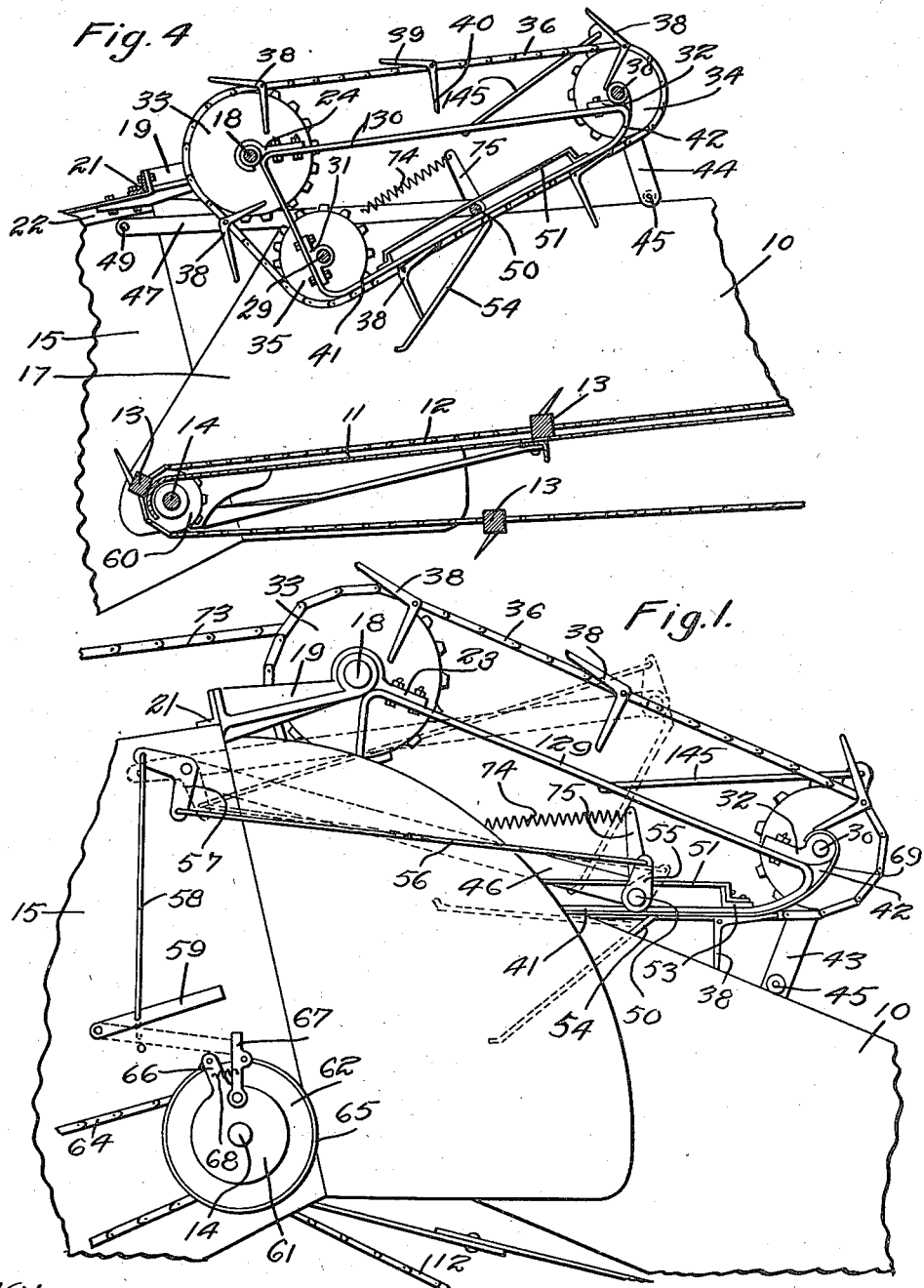

UNITED STATES PATENT OFFICE.

ELMER F. ALTMAN, OF MINNEAPOLIS, MINNESOTA, ASSIGNOR TO ANDREW J. PETERSON, OF ISANTI, MINNESOTA.

FEEDER FOR THRESHING-MACHINES.

1,261,338.         Specification of Letters Patent.         Patented Apr. 2, 1918.

Application filed May 1, 1916. Serial No. 94,631.

*To all whom it may concern:*

Be it known that I, ELMER F. ALTMAN, a citizen of the United States, residing at Minneapolis, in the county of Hennepin and State of Minnesota, have invented certain new and useful Improvements in Feeders for Threshing-Machines, of which the following is a specification.

My invention relates to feeders for threshing machines or grain separators, and has for its object to provide, in combination with the carrier and normally-operative means for driving the carrier, an overload feeder or delivery member upon a pivoted frame with means controlled by movement of said frame for rendering the carrier driving means inoperative, and also independent means actuated directly by the bundles upon the carrier to render the carrier driving means inoperative. The overload feeder or delivery member operates upon the tops of the bundles being delivered by the carrier, and is constantly driven so that bundles will be taken away from the carrier after the same has been stopped by the above indicated means until the feeder is relieved of its overload and the carrier driving means again becomes operative.

The full objects and advantages of my invention will appear in connection with the detailed description thereof and are particularly pointed out in the claims.

In the drawings, illustrating the application of my invention in one form,—

Figure 1 is a side elevational view of a portion of a grain separator including part of the shock elevator with my governor and overload feeder in place. Fig. 2 is a rear elevational view of the same as shown in Fig. 2 drawn to a smaller scale. Fig. 3 is a sectional elevational view of the parts shown in Fig. 2 taken on line 3—3 of Fig. 2. Fig. 4 is a view similar to Fig. 3 with some of the parts in different positions.

In the drawings part of an ordinary grain separator is shown. An elevator comprising the sides 10 and bottom 11 has a chain 12 provided with pronged slats 13, which chain passes over sprockets 60 on a shaft 14 journaled in the main body 15 of said separator. Said elevator is pivoted to raise and lower on said shaft, as shown in Figs. 2 and 4, and is arranged to deliver the grain shocks through a throat 17 into the body 15 of the separator.

The overload feeder element of my device is best shown in Figs. 3 and 4. A shaft 18 is journaled in brackets 19 and 20 secured to the angles 21 and 22 and parts of the body 15 and is constantly driven by a sprocket wheel 72 and chain 73. Rotatably secured to shaft 18 are a plurality of journal boxes 23, 24, 25, 26, 27 and 28 to which are attached a like number of triangular frame members 129, 130, 131, 132, 133 and 134 at the upper vertex thereof. These frame members are rigidly held together by means of transverse angle bars 52 and 53 riveted thereto. Near the other two vertexes of said triangular frame members are similarly journaled two shafts 29 and 30 in boxes 31 and boxes 32 attached to each of said triangular frame members. About sprockets 33, 34 and 35, fast on shafts 18, 30 and 29, respectively, pass chains 36 and 37. At equal intervals along these chains are pivoted angular forks 38 which have straight prongs 40 and outwardly-bent prongs 39. The shafts 29 and 30 are so situated in respect to the frame members 129, 130, etc., that the chains 36 and 37 travel close up to the lower portions 41 of these frame members. It will be noted that all the forks 38 are free to hang in any position except those on the under side of the chains 36 and 37, near portions 41. These are held in the positions shown by the portions 41 which engage prongs 40 and cause the forks to travel with these prongs parallel to the chains, as shown in Figs. 2 and 3. The bearings 32 and portions 41 are curved at 42 to gradually bring about this shifting of position of the forks as they approach this portion of the device. The object will become evident. When the forks 38 engage the grain shocks to feed them into the separator the same are rigidly held back against portions 41 and so effectively perform their duty. When the same are in proximity with pulleys 35, where the chains 36 and 37 change direction of travel, it will be noted that the guiding portions 41 cease to engage prongs 40 and the prongs 39 are free to be withdrawn from the shocks as they leave them. In this manner an effectual feeding device is produced in which the forks take hold of the shocks easily and quickly and leave them just as easily and at the right time. The shocks are prevented from passing between the frame members by plates 69, 70 and 71 riveted thereto.

The outer members 129 and 134 of the feeder frame are supported on arms 43 and 44 which have rollers 45 which engage the edges of the sides 10 of the elevator. Through these arms passes the shaft 30, and said arms are kept from rotating thereon by means of brace rods 145 which are secured to said frame members 129 and 134. As the elevator is raised from the extreme position shown in Fig. 3 to that shown in Fig. 4, the whole feeder frame oscillates about shaft 18 and is also raised through its contacts with the elevator sides 10 through the rollers 45 on the arms 44. Thus the feeder is in substantially the same relation to the top of the elevator, over which it is situated, in all positions of the same.

The device for stopping the elevating mechanism is best shown in Figs. 1 and 2. A pair of arms 46 and 47 are pivoted at one end to the interior of the separator body 15 at 48 and 49, and at their other ends they provide bearings for a transverse shaft 50. This shaft is free to oscillate and to slide relatively to the frame portions 41 within guideways formed by the upper surface of said portions and by guides 51 attached to the bracing angles 52 and 53. Shaft 50 is provided with a number of fingers 54 rigidly secured thereto which extend down into the throat 17, as best seen in Fig. 3. To the extreme end of shaft 50, which extends beyond one side 10 of the elevator, is secured a crank arm 55 which connects by means of a rod 56 with a bell crank 57 pivoted to the exterior of the separator body 15 at 48. Bell crank 57 is connected by means of a link 58 to an arm 59, which stops the elevating mechanism. This lever mechanism is held in the position shown in full lines in Fig. 3 by a spring 74 attached at one end to an arm 75 secured on shaft 50, and at the other end to the arm 47. The elevator drive shaft 14 has fast thereon the drive sprockets 60 and a disk 61. On said shaft adjacent disk 61 is loosely mounted a drum 62 to which is securely fastened a sprocket wheel 63 constantly driven by a chain 64. A brake band 65 is attached at one end to an ear 66 integral with disk 61 and at the other end to a finger 67 pivoted to said disk and is normally kept in engagement with the drum 62 by means of a spring 68. It will be noted that the finger 67 extends out beyond the periphery of the brake band 67, where it may be engaged by the arm 59. In the normal position the band 65 clutches the drum 62 and chain 64 drives the shaft 14. When the arm 59 is intercepted in the path of finger 67, said finger is caused to disengage the band 65 from the drum 62, allowing said drum and sprocket wheel 63 to rotate freely while the elevating mechanism is stopped.

The operation of the device is as follows: When a suitable number of grain shocks are entering the machine the parts are situated as shown in Figs. 3 and 1. As soon as an excess occurs the fingers 54 are raised and the levers actuated to cause the elevator to stop, as shown in dotted lines in Fig. 1. The excess will now be fed in by the forks 38 on the constantly-moving chains 36 and 37 until the fingers are again allowed to descend, when the elevator will again be set in action. If the overload should be too great the whole feeder frame will be lifted off from the elevator sides 10 before the fingers 54 can be raised, but this will produce the same effect as raising the fingers, as will be noted in Fig. 1, where a portion of the device, namely arm 46, has been shown in an elevated position in dotted lines.

My invention is exceedingly simple and positive in action and is automatic. It further adapts itself equally well whether the elevator is raised or lowered and may be applied to nearly any separator.

I claim:

1. A feeder for threshing machines comprising a delivery carrier, an over-load feeder, a rock-shaft associated with said feeder, fingers secured to said shaft and extending toward said carrier, means including a clutch for driving said delivery carrier, and operating connections between said fingers and clutch for disconnecting the latter and stopping the delivery carrier when said fingers are raised by excess of material fed by said delivery carrier.

2. A feeder for threshing machines comprising a delivery carrier, means including a clutch for driving said delivery carrier, an over-load feeder, a rock-shaft associated with said feeder, fingers secured to said shaft and extending toward said carrier, a crank arm on said rock shaft, a bell-crank pivoted to a support, a rod connecting said crank arm and one end of said bell crank, means for engaging a member of the clutch and a link connecting said means and the other end of said bell crank.

3. A feeder for threshing machines comprising a delivery carrier pivoted to said machine, means including a clutch for driving said delivery carrier, an over-load feeder pivoted to said machine, an arm pivoted at one end to said machine, a rock-shaft journaled in the other end of said arm, a slidable connection between said shaft and said over-load feeder, fingers secured to said shaft and extending toward said carrier, means for disconnecting the clutch and operating connections between said means and said shaft.

4. A feeder for threshing machines comprising a delivery carrier, means including a clutch for driving said delivery carrier, an over-load feeder pivoted to a support, depending fingers yieldingly carried by said over-load feeder, and operating connections between said fingers and clutch for disconnecting the clutch both when the fingers are raised and when the over-load feeder is raised.

5. A feeder for threshing machines comprising a delivery carrier, a constantly-driven shaft above the forward portion of said carrier, a frame mounted to oscillate about said shaft, a secondary delivery member mounted upon said frame and driven from said shaft and operative upon the tops of the bundles brought thereto by the carrier, normally-operative means for driving the carrier, depending fingers yieldingly carried by said frame, and operating connections between said fingers and said normally operative means for rendering said driving means inoperative both when the fingers are raised and when the frame is raised.

6. A feeder for threshing machines comprising a carrier frame and an endless carrier thereon mounted to oscillate in a vertical plane, a constantly driven shaft above the forward portion of said carrier, an auxiliary frame mounted at one end upon and so as to oscillate about said shaft and movably supported at the other end from the sides of said carrier frame, a delivery carrier mounted upon said auxiliary frame and driven from said shaft and operative upon the tops of the bundles brought thereto by the first named carrier, normally operative means for driving the first named carrier, depending fingers yieldingly carried by said auxiliary frame and operating connections between said fingers and said normally operated means for rendering said driven means inoperative both when the fingers are raised and when the auxiliary frame is raised.

7. A feeder for threshing machines comprising a delivery carrier, a frame mounted to oscillate about a horizontal axis above the carrier in a position to be engaged and lifted by bundles brought thereto by the carrier, an arm fast on said frame, normally-operative means for driving the carrier, means including a trigger for rendering said driving means operative, a lever journaled on the frame and having operative connection with the trigger, means normally holding said lever in fixed relation to the arm whereby movement of the frame and arm may operate the trigger, and means controlled by the feed of bundles, including said holding means, for operating the lever and trigger independently of movement of the arm.

8. A feeder for threshing machines comprising a carrier frame mounted for oscillation about a horizontal axis and having side walls, an endless carrier on said frame, normally-operative means for driving said carrier, a secondary carrier frame mounted for oscillation independently of the first-named frame and adapted to be partially supported by said side walls, and means mounted upon said secondary frame including arms extending into the space between said side walls into the path of bundles delivered by the carrier for rendering said carrier driving means inoperative.

In testimony whereof I affix my signature in presence of two witnesses.

ELMER F. ALTMAN.

Witnesses:
F. A. WHITELEY,
H. A. BOWMAN.